US009557554B2

(12) United States Patent
Nishimura et al.

(10) Patent No.: US 9,557,554 B2
(45) Date of Patent: Jan. 31, 2017

(54) WAVELENGTH-VARIABLE INTERFERENCE FILTER, OPTICAL MODULE, AND OPTICAL ANALYSIS DEVICE

(75) Inventors: Teruyuki Nishimura, Matsumoto (JP); Akira Sano, Shiojiri (JP); Seiji Yamazaki, Fujimi (JP)

(73) Assignee: Seiko Epson Corporation (JP)

( * ) Notice: Subject to any disclaimer, the term of this patent is extended or adjusted under 35 U.S.C. 154(b) by 354 days.

(21) Appl. No.: 13/211,667

(22) Filed: Aug. 17, 2011

(65) Prior Publication Data
US 2012/0050869 A1 Mar. 1, 2012

(30) Foreign Application Priority Data
Aug. 25, 2010 (JP) ................................ 2010-187953

(51) Int. Cl.
*G02B 26/00* (2006.01)

(52) U.S. Cl.
CPC .................................. *G02B 26/001* (2013.01)

(58) Field of Classification Search
CPC .......... G02B 5/284; G02B 26/001; G01J 3/26; G01J 2003/262; G01J 2003/265; G01J 2003/267
USPC ................. 359/260, 577–590; 356/450–521; 156/99–109
See application file for complete search history.

(56) References Cited

U.S. PATENT DOCUMENTS

| | | | |
|---|---|---|---|
| 6,275,324 B1 * | 8/2001 | Sneh ............................ 359/291 |
| 6,421,188 B1 | 7/2002 | Maehara | |
| 6,590,710 B2 | 7/2003 | Hara et al. | |
| 7,154,094 B2 | 12/2006 | Yokura et al. | |
| 7,349,136 B2 | 3/2008 | Chui | |
| 7,525,713 B2 | 4/2009 | Nakamura | |
| 7,630,114 B2 | 12/2009 | Wang et al. | |
| 8,233,219 B2 | 7/2012 | Takada et al. | |
| 2002/0061042 A1 * | 5/2002 | Wang et al. .................... 372/43 |
| 2005/0018302 A1 | 1/2005 | Yano et al. | |
| 2005/0100269 A1 | 5/2005 | Ishizuya et al. | |

(Continued)

FOREIGN PATENT DOCUMENTS

| | | |
|---|---|---|
| JP | 58-217901 | 12/1983 |
| JP | 08-254612 | 10/1996 |

(Continued)

OTHER PUBLICATIONS

Bucciarelli (Engineering Mechanics for Structures, pp. 7.9-7.11) (2002).*
Machine translation of Nakamura (JP 2008-116669 A).*

*Primary Examiner* — Kimberly N Kakalec
(74) *Attorney, Agent, or Firm* — Harness, Dickey & Pierce, P.L.C.

(57) ABSTRACT

An etalon includes a fixed mirror disposed on a first substrate, a movable mirror disposed on a second substrate to face the fixed mirror with a gap interposed therebetween, a first electrode disposed on the surface of the first substrate facing the second substrate, a second electrode disposed on a first surface of the second substrate facing the first substrate and separated from the first electrode, and a warp preventing film disposed on a second surface of the second substrate so as to cover at least the movable mirror in a plan view. The direction of an internal stress acting in the in-plane direction of the warp preventing film is parallel to the direction of an internal stress acting in the in-plane direction of the movable mirror and the second electrode.

25 Claims, 8 Drawing Sheets

(56) References Cited

U.S. PATENT DOCUMENTS

| | | | |
|---|---|---|---|
| 2005/0167597 A1* | 8/2005 | Yokura | G02B 26/001 250/343 |
| 2006/0183644 A1* | 8/2006 | Nakamura et al. | 505/210 |
| 2006/0222821 A1 | 10/2006 | Masai | |
| 2006/0245056 A1* | 11/2006 | Lin | 359/586 |
| 2007/0242920 A1 | 10/2007 | Lin et al. | |
| 2008/0186508 A1* | 8/2008 | Kiesel et al. | 356/519 |
| 2008/0246389 A1* | 10/2008 | Meincke et al. | 313/503 |
| 2009/0231666 A1* | 9/2009 | Gudlavalleti et al. | 359/290 |
| 2010/0103522 A1* | 4/2010 | Matsumoto | 359/578 |
| 2010/0142067 A1* | 6/2010 | Hanamura et al. | 359/850 |
| 2011/0019202 A1 | 1/2011 | Iwaki et al. | |
| 2012/0008097 A1 | 1/2012 | Okamuro et al. | |
| 2012/0050869 A1 | 3/2012 | Nishimura et al. | |
| 2012/0092666 A1 | 4/2012 | Meijer et al. | |
| 2012/0127482 A1 | 5/2012 | Tanemura et al. | |

FOREIGN PATENT DOCUMENTS

| | | |
|---|---|---|
| JP | 11-142752 | 5/1999 |
| JP | 2004-004547 A | 1/2004 |
| JP | 2005-043755 | 2/2005 |
| JP | 2005-083794 | 3/2005 |
| JP | 2005-215323 | 8/2005 |
| JP | 2005-279831 | 10/2005 |
| JP | 2005-308968 | 11/2005 |
| JP | 2006-286971 A | 10/2006 |
| JP | 2006-349775 | 12/2006 |
| JP | 2007-219483 | 8/2007 |
| JP | 2008-116669 A | 5/2008 |
| JP | 2009-217138 | 9/2009 |
| JP | 2009-251105 A | 10/2009 |
| JP | 2009-258406 | 11/2009 |
| JP | 2012-108371 A | 6/2012 |
| JP | 2012-112777 A | 6/2012 |
| WO | WO-2010-069497 A1 | 6/2010 |

* cited by examiner

WAVELENGTH-VARIABLE INTERFERENCE FILTER, OPTICAL MODULE, AND OPTICAL ANALYSIS DEVICE

BACKGROUND

1. Technical Field

The present invention relates to a wavelength-variable interference filter that selectively outputs light of a desired wavelength from incident light, an optical module that has the wavelength-variable interference filter, and an optical analysis device that has the optical module.

2. Related Art

A wavelength-variable interference filter has been known in which reflective films are disposed on opposite surfaces of a pair of substrates with a gap of a predetermined size interposed therebetween (for example, see JP-A-11-142752).

In the wavelength-variable interference filter described in JP-A-11-142752, driving electrodes are disposed on opposite surfaces of a pair of reflective films so as to adjust the gap, and the gap can be adjusted by the use of an electrostatic attractive force by applying a drive voltage to the driving electrodes. Accordingly, the wavelength-variable interference filter can transmit only light of a specific wavelength depending on the gap. That is, the wavelength-variable interference filter causes incident light to multiply interfere between a pair of reflective films and transmits only light of a specific wavelength which is strengthened due to the multiple interference.

Since the wavelength-variable interference filter transmits only light of a desired wavelength by adjusting the gap size, it requires high gap precision.

However, when the reflective film or the driving electrode is formed on one substrate, an internal stress acts in the in-plane direction (direction parallel to the surface of the substrate) of the reflective film and the driving electrode. The magnitude of the internal stress or the direction in which the internal stress acts is determined depending on film formation methods or film materials. The internal stress serves as a compressive stress when it acts in the direction towards each other, and the internal stress serves as a tensile stress when it acts in the direction awary from each other. Here, when the compressive stress acts on the driving electrode or the reflective film formed on one substrate, the substrate warps convexly toward the other substrate. On the other hand, when the tensile stress acts on the driving electrode or the reflective film formed on one substrate, the substrate warps convexly in the direction in which it is separated from the other substrate.

In this way, when the substrate warps due to the internal stress of the driving electrode or the reflective film, the reflective film also warps in an initial state where no driving voltage is applied to the driving electrode, thereby causing deterioration in resolution of the wavelength-variable interference filter.

SUMMARY

An advantage of some aspects of the invention is that it provides a wavelength-variable interference filter that has a resolution improved by reducing the warp occurring in a substrate, an optical module that has the wavelength-variable interference filter, and an optical analysis device that has the optical module.

According to an aspect of the invention, there is provided a wavelength-variable interference filter including: a first substrate; a second substrate that is disposed to face the first substrate; a first reflective film that is disposed on the surface of the first substrate facing the second substrate; a second reflective film that is disposed on a first surface of the second substrate facing the first substrate and that faces the first reflective film with a gap interposed therebetween; a first electrode that is disposed on the surface of the first substrate facing the second substrate; a second electrode that is disposed on the first surface of the second substrate and that is separated from the first electrode; and a warp preventing film that is disposed on a second surface of the second substrate which is a surface opposite to the first substrate and that covers at least the second reflective film when the second substrate is seen in its thickness direction in a plan view. Here, the direction of an internal stress acting in the in-plane direction of the warp preventing film, the direction of an internal stress acting in the in-plane direction of the second reflective film, and the direction of an internal stress acting in the in-plane direction of the second electrode are parallel to each other.

Here, the directions of the internal stresses acting in the in-plane directions of the warp preventing film, the second reflective film, and the second electrode are the in-plane directions of the films formed on a substrate. The internal stress serves as a compressive stress when it acts in the direction towards each other, and serves as a tensile stress when it acts in the direction away from each other. According to this configuration, the warp preventing film covering at least the second reflective film in the plan view is formed on the second surface of the second substrate. The direction of the internal stress acting in the in-plane direction of the warp preventing film is parallel to the direction of the internal stress acting in the in-plane direction of the second reflective film and the second electrode. For example, when the compressive stress acts in the in-plane direction of the second reflective film and the second electrode, the warp preventing film is formed on the second substrate so that the internal stress acting in the in-plane direction of the warp preventing film serves as the compressive stress.

When the second electrode includes plural electrode layers, the directions of the internal stresses of the electrode layers may be different from each other, as long as the direction of the internal stress in the second electrode as a whole is parallel to the direction of the internal stress in the second reflective film or the warp preventing film. Regarding the second reflective film, similarly, when the second reflective film is formed of a dielectric multi-layered film, the directions of the internal stresses of the layers of the dielectric multi-layered film may be different from each other, as long as the direction of the internal stress in the second reflective film as a whole is parallel to the direction of the internal stress in the second electrode or the warp preventing film.

As described above, for example, when the compressive stress acts in the in-plane direction of the second reflective film and the second electrode at the time of forming the second reflective film and the second electrode on the first surface of the second substrate, a force (bending moment) directed to the first substrate acts on the second substrate due to the influence of the compressive stress, whereby the second substrate warps convexly toward the first substrate.

However, in this aspect, the warp preventing film is formed on the second surface of the second substrate, whereby the direction of the internal stress in the warp preventing film is parallel to the direction of the internal stress in the second reflective film or the second electrode. The bending moment acting on the second substrate due to the compressive stress in the warp preventing film is cancelled by the bending moment acting due to the compressive stress of the second reflective film or the second electrode causing the second substrate to warp convexly toward the first substrate, thereby reducing the warp of the second substrate. In this aspect, since the warp preventing film is disposed to cover at least the second reflective film in the plan view, the warp of the portion of the second substrate on which the second reflective film is formed is particularly reduced, thereby reducing the warpage of the second reflective film. Accordingly, since the first reflective film and the second reflective film can be made to be parallel to each other, it is possible to improve the resolution of the wavelength-variable interference filter.

In the wavelength-variable interference filter, the sum of the product of the internal stress acting in the in-plane direction of the second reflective film, the thickness of the second reflective film, and the area of the second reflective film in the plan view and the product of the internal stress acting in the in-plane direction of the second electrode, the thickness of the second electrode, and the area of the second electrode in the plan view may be equal to the product of the internal stress acting in the in-plane direction of the warp preventing film, the thickness of the warp preventing film, and the area of the warp preventing film other than an area overlapping with a bonding portion of the first substrate and the second substrate in the plan view.

When a film is formed on a substrate, the bending moment acting on the substrate due to the internal stress in the film is determined depending on the product of the internal stress, the thickness, and the area. When the warp preventing film is formed on the entire second surface of the second substrate, the area of the warp preventing film used to calculate the product corresponds to the area other than an area overlapping with the bonding portion between the first substrate and the second substrate.

According to this configuration, the sum of the product of the internal stress, the thickness, and the area of the second reflective film and the product of the internal stress, the thickness, and the area of the second electrode is set to be equal to the product of the internal stress of the warp preventing film, the thickness thereof, and the area of the warp preventing film other than the area overlapping with the bonding portion between the first substrate and the second substrate. Accordingly, since the bending moment acting on the second substrate due to the internal stress in the second reflective film and the second electrode and the bending moment acting on the second substrate due to the internal stress in the warp preventing film are equal to each other in magnitude and are opposite to each other in direction, both bending moments are balanced, thereby satisfactorily reducing the warp of the second substrate. As a result, in the initial state where no driving voltage is applied to the first electrode and the second electrode, the first reflective film and the second reflective film can be made to be parallel to each other, thereby further improving the resolution of the wavelength-variable interference filter.

According to another aspect of the invention, there is provided a wavelength-variable interference filter including: a first substrate; a second substrate that is disposed to face the first substrate; a first reflective film that is disposed on the surface of the first substrate facing the second substrate; a second reflective film that is disposed on a first surface of the second substrate facing the first substrate and that faces the first reflective film with a gap interposed therebetween; a first electrode that is disposed on the surface of the first substrate facing the second substrate; a stacked film that includes a second electrode disposed on the first surface of the second substrate and separated from the first electrode and an insulating film covering the second electrode; and a warp preventing film that is disposed on a second surface of the second substrate which is a surface opposite to the first substrate and that covers at least the second reflective film when the second substrate is seen in its thickness direction in a plan view. Here, the direction of an internal stress acting in the in-plane direction of the stacked film, the direction of an internal stress acting in the in-plane direction of the second reflective film, and the direction of an internal stress acting in the in-plane direction of the warp preventing film are parallel to each other.

Here, paying attention to the stacked film as a whole, the direction of the internal stress may be parallel to the direction of the internal stress in the second reflective film or the warp preventing film or, for example, the direction of the internal stress in the insulating film and the direction of the internal stress in the second electrode may be different from each other.

According to this aspect, by covering the second electrode with the insulating film, it is possible to satisfactorily prevent the leakage of current due to discharge between the first electrode and the second electrode and thus to cause the first electrode and the second electrode to maintain desired charges corresponding to a set voltage. Accordingly, it is possible to precisely control the gap between the first reflective film and the second reflective film and thus to precisely extract light of a desired wavelength by the use of the wavelength-variable interference filter.

Since the direction of the internal stress in the stacked film including the second electrode and the insulating film, the direction of the internal stress in the second reflective film, and the direction of the internal stress in the warp preventing film are parallel to each other, the bending moments acting on the second substrate due to the internal stresses in the films are cancelled by each other, similarly to the above-mentioned aspect. Accordingly, similarly to the above-mentioned aspect, it is possible to reduce the warpage of the second reflective film due to the warp of the second substrate, thereby improving the resolution of the wavelength-variable interference filter.

In the wavelength-variable interference filter, the sum of the product of the internal stress acting in the in-plane direction of the second reflective film, the thickness of the second reflective film, and the area of the second reflective film in the plan view, the product of the internal stress acting in the in-plane direction of the second electrode, the thickness of the second electrode, and the area of the second electrode in the plan view, and the product of the internal stress acting in the in-plane direction of the insulating film, the thickness of the insulating film, and the area of the insulating film in the plan view may be equal to the product of the internal stress acting in the in-plane direction of the warp preventing film, the thickness of the warp preventing film, and the area of the warp preventing film other than an area overlapping with a bonding portion of the first substrate and the second substrate in the plan view.

According to this configuration, in the configuration in which the second electrode is covered with the insulating film, the sum of the products of the internal stresses acting on in the in-plane directions of the second reflective film, the second electrode, and the insulating film, the thicknesses thereof, and the areas thereof is set to be equal to the product of the internal stress acting in the in-plane direction of the warp preventing film, the thickness thereof, and the area other than the area overlapping with the bonding portion between the first substrate and the second substrate in the plan view. Here, the sum of the product of the internal stress, the thickness, and the area in the plan view of the second electrode and the product of the internal stress, the thickness, and the area in the plan view of the insulating film serves as the bending moment acting on the second substrate due to the influence of the internal stress in the stacked film.

Accordingly, since the bending moment acting on the second substrate due to the internal stresses in the second reflective film and the stacked film and the bending moment acting on the second substrate due to the internal stress in the warp preventing film are equal to each other, both bending moments are balanced, thereby satisfactorily reducing the warp of the second substrate. As a result, in the initial state where no driving voltage is applied to the first electrode and the second electrode, the first reflective film and the second reflective film can be made to be parallel to each other, thereby further improving the resolution of the wavelength-variable interference filter.

In the wavelength-variable interference filter, the warp preventing film may include a first warp preventing film that is disposed with the same shape and at the same position as the second reflective film in the plan view and a second warp preventing film that is disposed at a position symmetric with respect to a center point of the first warp preventing film in the plan view.

For example, when the second warp preventing film is not formed at the position symmetric about a point and a voltage is applied across the electrodes to warp the substrate, the balance of the warps is not taken, thereby making it difficult to cause the first reflective film and the second reflective film to be parallel to each other.

According to this configuration, the second warp preventing film is formed at the position symmetric about the center point of the first warp preventing film in the plan view. Accordingly, when a voltage is applied across the electrodes to warp the substrate, the balance of the warps can be taken to cause the first reflective film and the second reflective film to be parallel to each other, thereby maintaining higher gap precision.

In the wavelength-variable interference filter, the warp preventing film may be formed on the entire second surface of the second substrate.

According to this configuration, since the warp preventing film is formed on the entire second surface of the second substrate, it is possible to make a pattern forming process of forming the warp preventing film on the second substrate unnecessary in the manufacturing procedure thereof, thereby simplifying the manufacturing procedure.

In the wavelength-variable interference filter, the warp preventing film may be formed of a material having the same refractive index as the second substrate.

According to this configuration, since the warp preventing film is formed of a material having the same refractive index as the second substrate, it is possible to prevent light incident on the second substrate from being reflected by the bonding face between the warp preventing film and the second substrate. Accordingly, it is possible to transmit only light of a specific wavelength among the incident light.

According to still another aspect of the invention, there is provided an optical module including: the above-mentioned wavelength-variable interference filter and a light-receiving member that receives test object light transmitted by the wavelength-variable interference filter.

According to this aspect, similarly to the above-mentioned aspects, since the warpage of the second reflective film due to the warp of the second substrate can be reduced to cause the first reflective film and the second reflective film to be parallel to each other, it is possible to improve the resolution of the wavelength-variable interference filter. Accordingly, it is possible to disperse light of a desired wavelength with high precision. As a result, by receiving light emitted from the wavelength-variable interference filter by the use of the light-receiving member, the optical module can accurately measure the light intensity of a light component of a desired wavelength included in test object light.

According to yet another aspect of the invention, there is provided an optical analysis device including the above-mentioned optical module and an analyzer unit that analyzes optical characteristics of the test object light on the basis of the light received by the light-receiving member of the optical module.

According to this aspect, since the optical analysis device includes the optical module having the above-mentioned wavelength-variable interference filter, it is possible to measure the light intensity with high precision. By performing an optical analysis process on the basis of the measurement result, it is possible to accurately analyze the optical characteristics.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the accompanying drawings.

1. Configuration of Colorimetric Device

Figure 1:
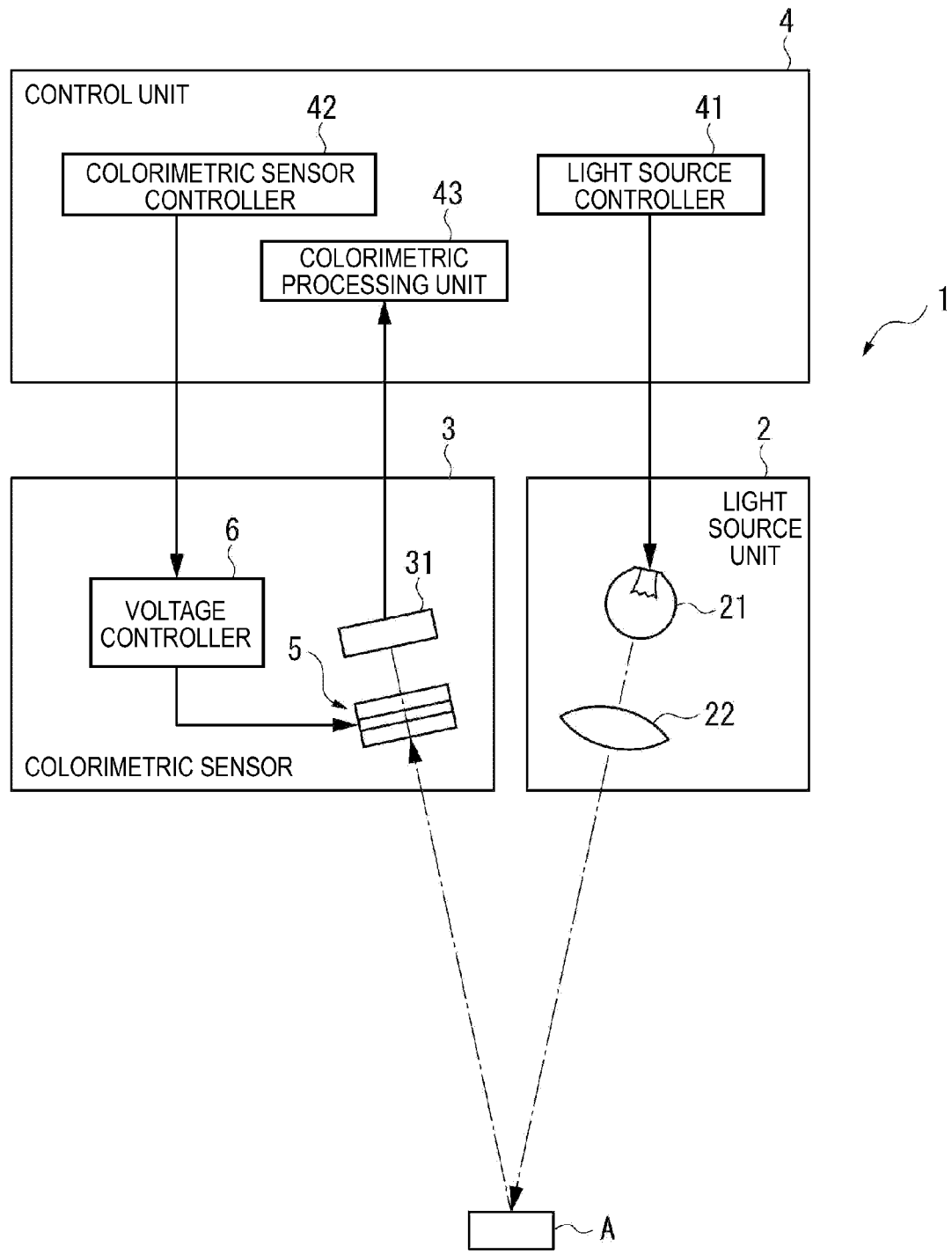
FIG. 1 is a diagram schematically illustrating the configuration of a colorimetric module according to a first embodiment of the invention.

FIG. 1 is a diagram schematically illustrating the configuration of a colorimetric device (the optical analysis device) including a wavelength-variable interference filter according to the first embodiment of the invention.

The colorimetric device 1 includes a light source unit 2 that emits light to a test object A, a colorimetric sensor 3 that is the optical module described in the above-described aspects, and a control unit 4 that controls the entire operation of the colorimetric device 1, as shown in FIG. 1. The colorimetric device 1 is a module that causes the test object A to reflect light emitted from the light source unit 2, receives the reflected test object light by the use of the colorimetric sensor 3, and analyzes and measures the chromaticity of the test object light, that is, the color of the test object A, on the basis of a detection signal output from the colorimetric sensor 3.

2. Configuration of Light Source Unit

The light source unit 2 includes a light source 21 and plural lenses 22 (only one of which is shown in FIG. 1) and emits white light to the test object A. The plural lenses 22 include a collimator lens and the light source unit 2 converts the white light emitted from the light source 21 into parallel light by the use of the collimator lens and emits the parallel light to the test object A through a projection lens not shown.

3. Configuration of Colorimetric Sensor

As shown in FIG. 1, the colorimetric sensor 3 includes an etalon 5 constituting the wavelength-variable interference filter described in the above-described aspects, a light-receiving element 31 as a light-receiving member receiving light passing through the etalon 5, and a voltage controller 6 changing the wavelength of light transmitted by the etalon 5. The colorimetric sensor 3 further includes an incidence optical lens (not shown) guiding the reflected light (test object light) reflected by the test object A to the inside thereof at a position facing the etalon 5. In the colorimetric sensor 3, the etalon 5 disperses only light of a desired wavelength out of the test object light incident from the incidence optical lens and the light-receiving element 31 receives the dispersed light.

The light-receiving element 31 includes plural photoelectric conversion elements and generates an electrical signal corresponding to the received light intensity. The light-receiving element 31 is connected to the control unit 4 and outputs the generated electrical signal as a light-reception signal to the control unit 4.

3-1. Configuration of Etalon

Figure 2:
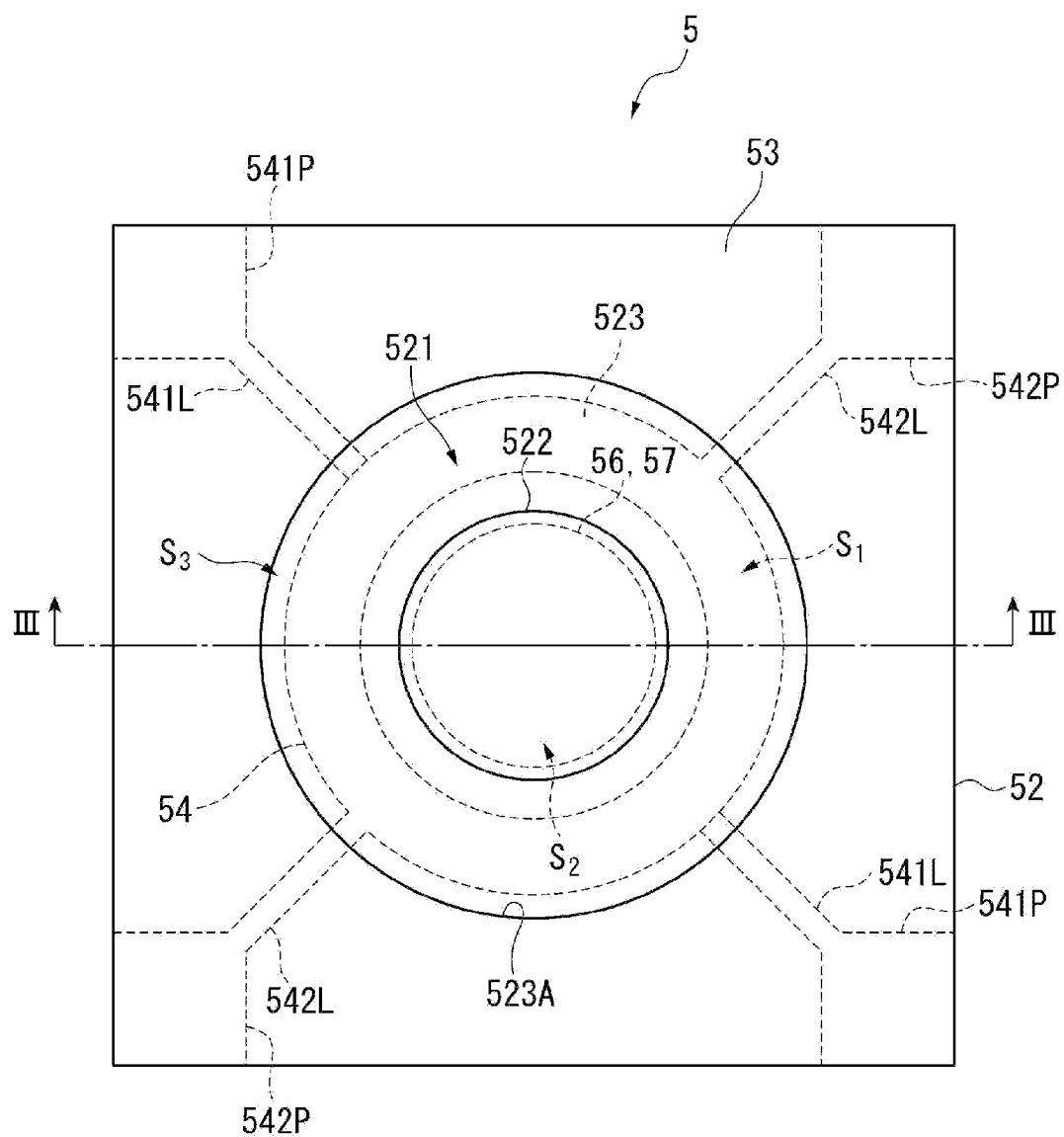
FIG. 2 is a plan view schematically illustrating the configuration of an etalon according to the first embodiment.
Figure 3:
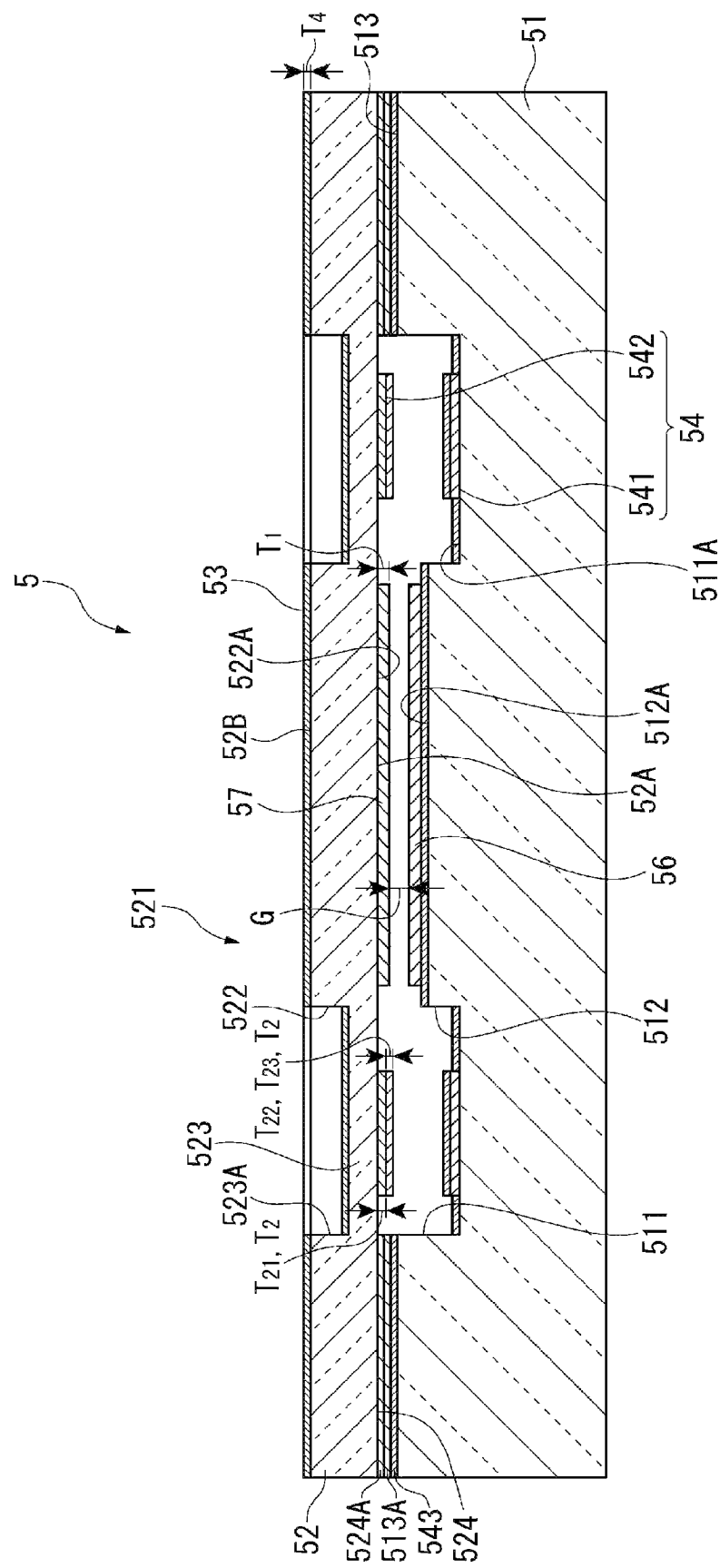
FIG. 3 is a sectional view schematically illustrating the configuration of an etalon according to the first embodiment.

FIG. 2 is a plan view schematically illustrating the configuration of the etalon 5 and FIG. 3 is a sectional view schematically illustrating the configuration of the etalon 5. The test object light is incident on the etalon 5 from the downside in FIG. 1, but the test object light is incident on the etalon from the upside in FIG. 3.

As shown in FIG. 2, the etalon 5 is a square planar plate-like optical member and has a side of, for example, 10 mm. As shown in FIG. 3, the etalon 5 includes a first substrate 51 and a second substrate 52. These two substrates 51 and 52 employ a quartz glass substrate formed of $SiO_2$ (silicon dioxide) in this embodiment. The substrates 51 and 52 may be formed of a variety of glass such as soda glass, crystalline glass, lead glass, potassium glass, borosilicate glass, and non-alkali glass or crystal. Among these, glass containing alkali metals such as sodium (Na) and potassium (K) can be preferably used as the material of the substrates 51 and 52. By forming the substrates 51 and 52 out of this glass, it is possible to enhance the close adhesiveness to mirrors 56 and 57 or electrodes 541 and 542 to be described later or the bonding strength between the substrates 51 and 52. These two substrates 51 and 52 are formed in a body by bonding faces 513 and 524 as bonding portions to be described later.

A fixed mirror 56 as a first reflective film and a movable mirror 57 as a second reflective film are disposed between the first substrate 51 and the second substrate 52. Here, the fixed mirror 56 is fixed to a surface of the first substrate 51 facing the second substrate 52 and the movable mirror 57 is fixed to a surface of the second substrate 52 facing the first substrate 51. The fixed mirror 56 and the movable mirror 57 are disposed to face each other with an inter-mirror gap G interposed therebetween.

An electrostatic actuator 54 used to adjust the inter-mirror gap G between the fixed mirror 56 and the movable mirror 57 is disposed between the first substrate 51 and the second substrate 52.

3-1-1. Configuration of First Substrate

The first substrate 51 is formed by processing a quartz glass substrate ($SiO_2$: silicon dioxide) with a thickness of, for example, 500 μm by etching. Specifically, as shown in FIG. 3, an electrode-forming groove 511 and a mirror fixing portion 512 are formed in the first substrate 51 by etching.

The electrode-forming groove 511 is formed in a circular shape centered on a planar center point in a plan view (hereinafter, referred to as an etalon plan view) in which the etalon 5 is seen in the thickness direction as shown in FIG. 2.

The mirror fixing portion 512 is formed to protrude from the center of the electrode-forming groove 511 toward the second substrate 52 in the etalon plan view.

In the electrode-forming groove 511, a ring-like electrode fixing face 511A is formed from the outer circumferential edge of the mirror fixing portion 512 to the inner circumferential wall of the electrode-forming groove 511, and a first electrode 541 is formed on the electrode fixing face 511A. The first electrode 541 has conductivity and is not particularly limited as long as it can generate an electrostatic attractive force between the first electrode 541 and the second electrode 542 by applying a voltage across the first electrode 541 and the second electrode 542 of the second substrate 52 to be described later. ITO (Indium Tin Oxide) is used in this embodiment. A metal stacked body such as Au/Cr may be used. An insulating film 543 is formed on the top surface of the first electrode 541. The insulating film 543 can be formed of $SiO_2$ or TEOS (tetraethoxy silane) and $SiO_2$ having the same optical characteristics as the glass substrate constituting the first substrate 51 is particularly preferable. When the insulating film 543 is formed of $SiO_2$, light is not reflected between the first substrate 51 and the insulating film 543. Accordingly, for example, as shown in FIG. 3, the insulating film 543 can be formed on the entire surface of the first substrate 51 facing the second substrate 52 after forming the first electrode 541 on the first substrate 51. The insulating film 543 is a film disposed to prevent the leakage of current between the first electrode 541 and the second electrode 542 due to discharge and may be formed of a film not having a light-transmitting property. In this case, the insulating film 543 on the mirror fixing face 512A may be removed.

First electrode drawing lines 541L are formed to extend from parts of the outer circumferential edge of the first electrode 541 to the lower-right side and the upper-left side of the etalon 5 in the etalon plan view shown in FIG. 2. A first electrode pad 541P is formed at the end of each first electrode drawing line 541L and the first electrode pad 541P is connected to the voltage controller 6 (see FIG. 1).

Here, in order to drive the electrostatic actuator 54, a voltage is applied to only one of a pair of first electrode pads 541P by the voltage controller 6 (see FIG. 1). The other first electrode pad 541P is used as a detection terminal used to detect an amount of charges held by the first electrode 541.

The mirror fixing portion 512 is formed in a cylindrical shape with a diameter smaller than that of the electrode-forming groove 511 to be coaxial with the electrode-forming groove 511, as described above. In this embodiment, as shown in FIG. 3, the mirror fixing face 512A of the mirror fixing portion 512 facing the second substrate is formed closer to the second substrate 52 than the electrode fixing face 511A, but the invention is not limited to this configuration. The heights of the electrode fixing face 511A and the mirror fixing face 512A are properly set depending on the inter-mirror gap G between the fixing mirror 56 fixed to the mirror fixing face 512A and the movable mirror 57 formed on the second substrate 52, the distance between the first electrode 541 and the second electrode 542 formed on the second substrate 52 and described later, and the thickness of the fixed mirror 56 or the movable mirror 57 and are not limited to the above-mentioned configuration. For example, when a dielectric multi-layered film mirror is used as the mirrors 56 and 57 and thus the thickness thereof increases, the configuration in which the electrode fixing face 511A and the mirror fixing face 512A are formed to be flush with each other or the configuration in which a mirror-fixing groove having a cylindrical groove shape is formed at the center of the electrode fixing face 511A and the mirror fixing face 512A is formed on the bottom surface of the mirror-fixing groove may be employed.

In the mirror fixing face 512A of the mirror fixing portion 512, the depth of the groove can be preferably designed in consideration of the wavelength range in which light is transmitted by the etalon 5. For example, in this embodiment, the initial value (the value of the inter-mirror gap G in a state where no voltage is applied across the first electrode 541 and the second electrode 542) of the inter-mirror gap G between the fixed mirror 56 and the movable mirror 57 is set to 450 nm and the movable mirror 57 can be displaced until the inter-mirror gap G reaches, for example, 250 nm by applying a voltage across the first electrode 541 and the second electrode 542. Accordingly, by changing the voltage to be applied across the first electrode 541 and the second electrode 542, it is possible to selectively disperse and transmit light of wavelengths in the entire visible ray range. In this case, the thicknesses of the fixed mirror 56 and the movable mirror 57 and the heights of the mirror fixing face 512A and the electrode fixing face 511A may be set to values allowing the inter-mirror gap G to vary in the range of 250 nm to 450 nm.

The fixed mirror 56 having a circular shape with a diameter of about 3 mm and having a predetermined thickness $T_2$ is fixed to the mirror fixing face 512A. The fixed mirror 56 is a mirror formed of a dielectric multi-layered film of $TiO_2$—$SiO_2$ and is formed on the insulating film 543 formed on the mirror fixing face 512A by a method such as a sputtering method.

In this embodiment, the mirror formed of the dielectric multi-layered film of $TiO_2$—$SiO_2$ is used as the fixed mirror 56, but a mirror including a single layer of Ag alloy capable of covering the entire visible ray range as a dispersible wavelength range may be used.

Here, the portion of the first substrate 51 in which the electrode-forming groove 511 and the mirror fixing portion 512 are not formed serves as the bonding face 513 of the first substrate 51. A first bonding film 513A is formed on the insulating film 543 formed on the bonding face 513, as shown in FIG. 3. A plasma polymerized film formed of polyorganosiloxane or the like can be used as the main material of the first bonding face 513A.

3-1-2. Configuration of Second Substrate

The second substrate 52 is formed by processing a quartz glass substrate ($SiO_2$: silicon dioxide) with a thickness of, for example, 200 μm by etching.

As shown in FIG. 2, a circular displacement portion 521 centered on the substrate center point in the etalon plan view is formed on the second substrate 52. As shown in FIG. 3, the displacement portion 521 includes a cylindrical movable portion 522 and a connection holding portion 523 disposed to be coaxial with the movable portion 522 so as to hold the movable portion 522.

The displacement portion 521 is formed by forming a groove in a plate-like glass substrate, which is a material of the second substrate 52, by etching. That is, the displacement portion 521 is formed by forming a ring-like concave groove 523A, in which the connection holding portion 523 should be formed, in the incident surface of the second substrate 52 not facing the first substrate 51.

The movable portion 522 has a thickness greater than that of the connection holding portion 523 and is formed in a thickness of, for example, 200 μm which is the same thickness as the second substrate 52 in this embodiment. The movable portion 522 includes a movable face 522A, which is parallel to the mirror fixing portion 512, on the first surface 52A facing the first substrate 51 and the movable mirror 57 is fixed to the movable face 522A.

Here, the movable mirror 57 is a mirror having the same configuration as the fixed mirror 56 and has a circular shape with a diameter of, for example, 3 mm and a predetermined thickness $T_1$. In this embodiment, a mirror of the dielectric multi-layered film of $TiO_2$—$SiO_2$ is used.

The connection holding portion 523 is a diaphragm surrounding the movable portion 522 and has a thickness of, for example, 30 μm. The second electrode 542 having a ring shape and facing the first electrode 541 with a predetermined electromagnetic gap interposed therebetween is formed on the surface of the connection holding portion 523 facing the first substrate 51. Here, the second electrode 542 and the first electrode 541 constitute the electrostatic actuator 54.

The second electrode 542 includes an ITO layer having a predetermined thickness $T_{21}$ and being formed on the second substrate 52 side out of ITO and a stacked body with a thickness $T_2$ of a CR layer having a predetermined thickness $T_{22}$ and an Au layer having a predetermined thickness $T_{23}$ and being formed on the first substrate 51 side out of an Au/Cr metal stacked body.

The second electrode 542 is not limited to this configuration, but may be a film formed of any one of the ITO and the Au/Cr metal stacked body.

A pair of second electrode drawing lines 542L are formed to extend from parts of the outer circumferential edge of the second electrode 542 to the outer circumference and a second electrode pad 542P is formed at the end of each second electrode drawing line 542L. More specifically, the second electrode drawing lines 542L extend to the lower-left side and the upper-right side of the etalon 5 in the etalon plan view shown in FIG. 2 and are formed to be symmetric about the planar center point of the second substrate 52.

Similarly to the first electrode pad 541P, the second electrode pad 542P is connected to the voltage controller 6, and a voltage is applied to only one of a pair of second electrode pads 542P at the time of driving the electrostatic actuator 54. The other second electrode pad 542P is used as a detection terminal used to detect an amount of charges held by the second electrode 542.

Here, in the first surface 52A of the second substrate 52, the region facing the bonding face 513 of the first substrate 51 serves as a bonding face 524 of the second substrate 52. A second bonding film 524A formed of polyorganosiloxane as a main material is disposed on the bonding face 524, similarly to the bonding face 513 of the first substrate 51.

A warp preventing film 53 including a first warp preventing film and a second warp preventing film having a predetermined thickness $T_4$ and a light-transmitting property is disposed on the entire second surface 52B of the second substrate 52 opposite to the surface facing the first substrate 51.

The warp preventing film 53 is formed of a material having the same refractive index as the second substrate 52 and is formed of, for example, a quartz glass material ($SiO_2$: silicon dioxide) which is the same material as the second substrate 52 in this embodiment. The warp preventing film 53 serves to reduce the warp of the second substrate 52 which warps convexly toward the first substrate 51 due to the internal stresses (the compressive stresses in this embodiment) acting in the in-plane directions of the movable mirror 57 and the second electrode 542 at the time of forming the movable mirror 57 and the second electrode 542 on the bottom surface of the second substrate 52 facing the first substrate 51.

That is, at the time of forming the second electrode 542 or the movable mirror 57 on the first surface 52A of the second substrate 52, the second substrate 52 tends to warp toward the first substrate 51 due to the internal stress (the compressive stress) of the second electrode 542 or the movable mirror 57. Here, when the movable mirror 57 is formed of a dielectric multi-layered film of $TiO_2$—$SiO_2$, the sum of the internal stresses, the thicknesses, and the areas in the plan view of the layers (the $TiO_2$ layer and the $SiO_2$ layer) of the movable mirror 57 acts as a bending moment on the second substrate 52. Here, when the bending moment of the movable mirror 57 acting on the second substrate 52 is $M_1$, the total internal stress of the movable mirror 57 is $\sigma_1$, the total thickness of the movable mirror 57 is $T_1$, the area of the movable mirror 57 in the plan view is $S_1$, the internal stress of the $TiO_2$ layers is $\sigma_{11}$, the thickness of the $TiO_2$ layers is $T_{11}$, the number of layers of the $TiO_2$ layers is $N_{11}$, the internal stress of the $SiO_2$ layers is $\sigma_{12}$, the thickness of the $SiO_2$ layers is $T_{12}$, and the number of layers of the $SiO_2$ layers is $N_{12}$, Expression (1) is established.

$$M_1 \propto \sigma_1 \times T_1 \times S_1 = (\sigma_{11} \times T_{11} \times N_{11} \times S_1) + (\sigma_{12} \times T_{12} \times N_{12} \times S_1) \quad (1)$$

In this embodiment, the internal stresses of the movable mirror 57, the second electrode 542, and the warp preventing film 53 are set to form the compressive stress. For example, even when the internal stresses of the $TiO_2$ layer and the $SiO_2$ layer in the movable mirror 57 are the tensile stress and the compressive stress, respectively, the internal stresses may be set so that the total internal stress $\sigma_1$ of the movable mirror 57 is the compressive stress. The bending moment $M_1$ calculated by Expression (1) serves as a force from the movable mirror 57 which causes the second substrate 52 to warp.

Similarly, when the second electrode 542 is a stacked body of ITO/Cr/Au, the sum of the internal stresses, the thicknesses, and the areas in the plan view of the layers (ITO, Cr, and Au) of the second electrode 542 serve as the internal stress of the second electrode 542. Here, when the bending moment of the second electrode 542 acting on the second substrate 52 is $M_2$, the internal stress of the second electrode 542 is $\sigma_2$, the total thickness of the second electrode 542 is $T_2$, the area of the second electrode 542 in the etalon plan view is $S_2$, the internal stress of the ITO layer is $\sigma_{21}$, the thickness of the ITO layer is $T_{21}$, the internal stress of the Cr layer is $\sigma_{22}$, the thickness of the Cr layer is $T_{22}$, the internal stress of the Au layer is $\sigma_{23}$, and the thickness of the Au layer is $T_{23}$, Expression (2) is established.

$$M_2 \propto \sigma_2 \times T_2 \times S_2 = (\sigma_{21} \times T_{21} \times S_2) + (\sigma_{22} \times T_{22} \times S_2) + (\sigma_{23} \times T_{23} \times S_2) \quad (2)$$

As described above, in this embodiment, the internal stress of the second electrode 542 is set to be the compressive stress. For example, even when the internal stress of the ITO layer is the compressive stress and the internal stresses of the Cr and Au layers are the tensile stress, the internal stresses may be set so that the total internal stress $\sigma_2$ of the second electrode 542 is the compressive stress. The bending moment $M_2$ calculated by Expression (2) serves as a force from the second electrode 542 which causes the second substrate 52 to warp.

As described above, when the internal stress $\sigma_1$ of the movable mirror 57 and the internal stress $\sigma_2$ of the second electrode 542 are equal to each other in direction and form the compressive stress, a bending moment $M_3$ calculated by Expression (3) acts on the second substrate 52 and serves as a force causing the second substrate 52 to warp toward the first substrate 51.

$$M_3 = M_1 + M_2 \quad (3)$$

The warp preventing film 53 is a film provided to cancel the bending moment $M_3$ being calculated by Expression (3) and acting on the second substrate 52, and has the internal stress (the compressive stress) which is equal in direction to the internal stress (the compressive stress) acting in the in-plane direction of the second electrode 542 and the movable mirror 57. The warp preventing film 53 is disposed on the second surface 52B opposite to the first surface 52A on which the second electrode 542 and the movable mirror 57 are disposed. Accordingly, the bending moment acting on the second substrate 52 due to the internal stress of the warp preventing film 53 acts in the direction in which the second substrate 52 is separated from the first substrate 51.

The bonding face 524 of the second substrate 52 is a portion bonded to the first substrate 51, is not influenced by the internal stresses of the second electrode 542, the movable mirror 57, and the warp preventing film 53, and thus does not warp. On the other hand, the portion of the second surface 52B of the second substrate 52 not overlapping with the bonding face 524 in the etalon plan view is a portion (gap forming portion) forming a gap along with the first substrate 51 and is influenced by the internal stresses of the second electrode 542, the movable mirror 57, and the warp preventing film 53. Accordingly, the warp of the second substrate 52 due to the internal stress of the second electrode 542 or the movable mirror 57 is prevented by the portion, which overlaps with the gap forming portion in the etalon plan view, of the warp preventing film 53 formed on the second surface 52B of the second substrate 52.

Here, when the bending moment of the warp preventing film 53 acting on the second substrate 52 is $M_4$, the internal stress (the compressive stress) of the warp preventing film 53 is $\sigma_4$, the thickness of the warp preventing film 53 is $T_4$, and the area of the portion overlapping with the gap forming portion in the etalon plan view is $S_4$, the bending moment $M_4$ calculated by Expression (4) acts on the second substrate 52. Accordingly, by forming the warp preventing film 53 so that the bending moment $M_4$ has the relationship expressed by Expression (5), it is possible to cancel the bending moment $M_3$ applied to the second substrate 52 by the second electrode 542 and the movable mirror 57, thereby preventing the warp of the second substrate 52.

$$M_4 \propto \sigma_4 \times T_4 \times S_4 \quad (4)$$

$$M_4 = M_3 \quad (5)$$

3-2. Configuration of Voltage Controller

The voltage controller 6 controls the voltage to be applied to the first electrode 541 and the second electrode 542 of the electrostatic actuator 54 on the basis of a control signal input from the control unit 4.

4. Configuration of Control Unit

The control unit 4 controls the entire operation of the colorimetric device 1. For example, a general-purpose personal computer, a personal digital assistant (PDA), and other colorimetry-dedicated computers can be used as the control unit 4.

As shown in FIG. 1, the control unit 4 includes a light source controller 41, a colorimetric sensor controller 42, and a colorimetric processing unit 43 (the analyzer unit).

The light source controller 41 is connected to the light source unit 2. The light source controller 41 outputs a predetermined control signal to the light source unit 2 on the basis of, for example, a user's setting input so as to emit white light with predetermined brightness from the light source unit 2.

The colorimetric sensor controller 42 is connected to the colorimetric sensor 3. The colorimetric sensor controller 42 sets the wavelength of light to be received by the colorimetric sensor 3, for example, on the basis of a user's setting input and outputs a control signal instructing to detect the light intensity of light of the set wavelength to the colorimetric sensor 3. Accordingly, the voltage controller 6 of the colorimetric sensor 3 sets a voltage to be applied to the electrostatic actuator 54 so as to transmit only light of the wavelength desired by the user on the basis of the control signal.

The colorimetric processing unit 43 controls the colorimetric sensor controller 42 to change the inter-mirror gap of the etalon 5 and to change the wavelength of light to be transmitted by the etalon 5. The colorimetric processing unit 43 acquires the light intensity of light transmitted by the etalon 5 on the basis of the light-reception signal input from the light-receiving element 31. The colorimetric processing unit 43 calculates the chromaticity of light reflected by the test object A on the basis of the light intensity of light of the wavelengths acquired as described above.

5. Method of Manufacturing Etalon

A method of manufacturing the etalon 5 will be described below with reference to FIGS. 4A to 4F and FIGS. 5A to 5E.

The etalon 5 is manufactured by forming the first substrate 51 and the second substrate 52 and bonding the first substrate 51 and the second substrate 52 to each other.

5-1. First Substrate Forming Step

First, a quartz glass substrate with a thickness of 500 μm which is a material of the first substrate 51 is prepared and both surfaces thereof are precisely polished until the surface roughness Ra of the quartz glass substrate is 1 nm or less. A resist 61 for forming the electrode-forming groove 511 is applied to the surface of the first substrate 51 facing the second substrate 52, the applied resist 61 is exposed and developed by the use of a photolithographic method, and the region in which the electrode-forming groove 511 should be formed is patterned as shown in FIG. 4A.

Figure 4:
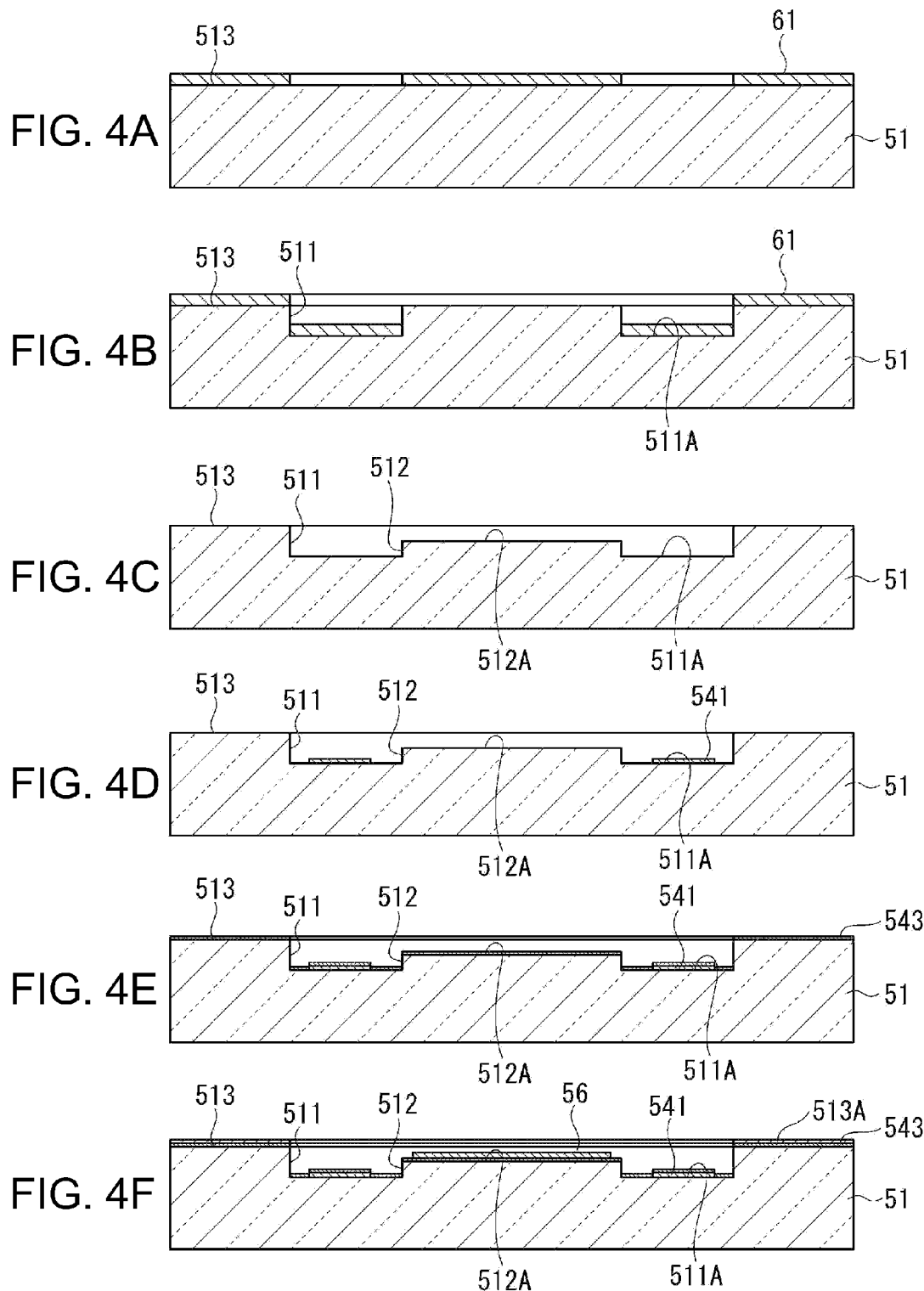
FIGS. 4A to 4F are diagrams illustrating a procedure of manufacturing a first substrate of the etalon according to the first embodiment.

As shown in FIG. 4B, the electrode-forming groove 511 is formed in a desired depth by etching to form the electrode fixing face 511A. A wet etching method is used herein.

The resist 61 for forming the mirror fixing face 512A is applied to the surface of the first substrate 51 facing the second substrate 52, the applied resist 61 is exposed and developed by the use of a photolithographic method, and the region in which the mirror fixing face 512A should be formed is patterned as shown in FIG. 4B.

Then, the resultant structure is etched until the mirror fixing face 512A is located at a desired position, and the resist 61 is then removed as shown in FIG. 4C.

An ITO film is formed on the surface of the first substrate 51 facing the second substrate 52 by the use of a sputtering method. By forming a resist having a desired electrode pattern on the ITO film and etching the ITO film by the use of a photolithographic method, the first electrode 541 is formed on the electrode fixing face 511A as shown in FIG. 4D. Thereafter, the resist remaining on the surface of the first substrate 51 facing the second substrate 52 is removed.

Similarly, by forming a TEOS film with a thickness of 0.1 μm on the surface of the first surface 51 facing the second substrate 52 by the use of a plasma CVD method, the insulating film 543 is formed on the first electrode 541, the electrode fixing face 511A, the bonding face 513, and the mirror fixing face 512A as shown in FIG. 4E.

Similarly, a resist having a pattern for exposing only the area of the mirror fixing face 512A in which the fixed mirror 56 should be formed is formed on the surface of the first substrate 51 facing the second substrate 52, and a thin film of $TiO_2$—$SiO_2$ having a predetermined thickness $T_2$ is formed by the use of a sputtering method or a vapor deposition method. By removing the resist, the fixed mirror 56 is formed on the insulating film 543 formed on the mirror fixing face 512A as shown in FIG. 4F.

Similarly, a resist having a pattern for exposing only the area in which the first bonding film 513A should be formed is formed on the surface of the first substrate 51 facing the second substrate 52, and a plasma polymerized film is formed out of polyorganosiloxane with a thickness of 30 nm by the use of a plasma CVD method. By removing the resist, the first bonding film 513A is formed on the insulating film 543 formed on the bonding face 513 as shown in FIG. 4F.

The first substrate 51 is formed in this way.

5-2. Second Substrate Forming Step

In order to form the second electrode 542, the movable mirror 57, and the warp preventing film 53 to satisfy the relationship expressed by Expression (5) in forming the second substrate 52, the sputtering conditions of the films are set in advance and the internal stresses thereof when the films are formed using a sputtering method under the set sputtering conditions are measured in advance. The thicknesses and the areas of the second electrode 542 and the movable mirror 57 and the thickness of the warp preventing film 53 satisfying Expression (5) are determined by simulation. The thicknesses and the areas of the second electrode 542 and the movable mirror 57 are set depending on a wavelength band in which it is desired to disperse the test object light by the use of the etalon 5.

Thereafter, a quartz glass substrate with a thickness of 200 μm which is a material of the second substrate 52 is prepared and both surfaces thereof are precisely polished until the surface roughness Ra of the quartz glass substrate is 1 nm or less.

Figure 5:
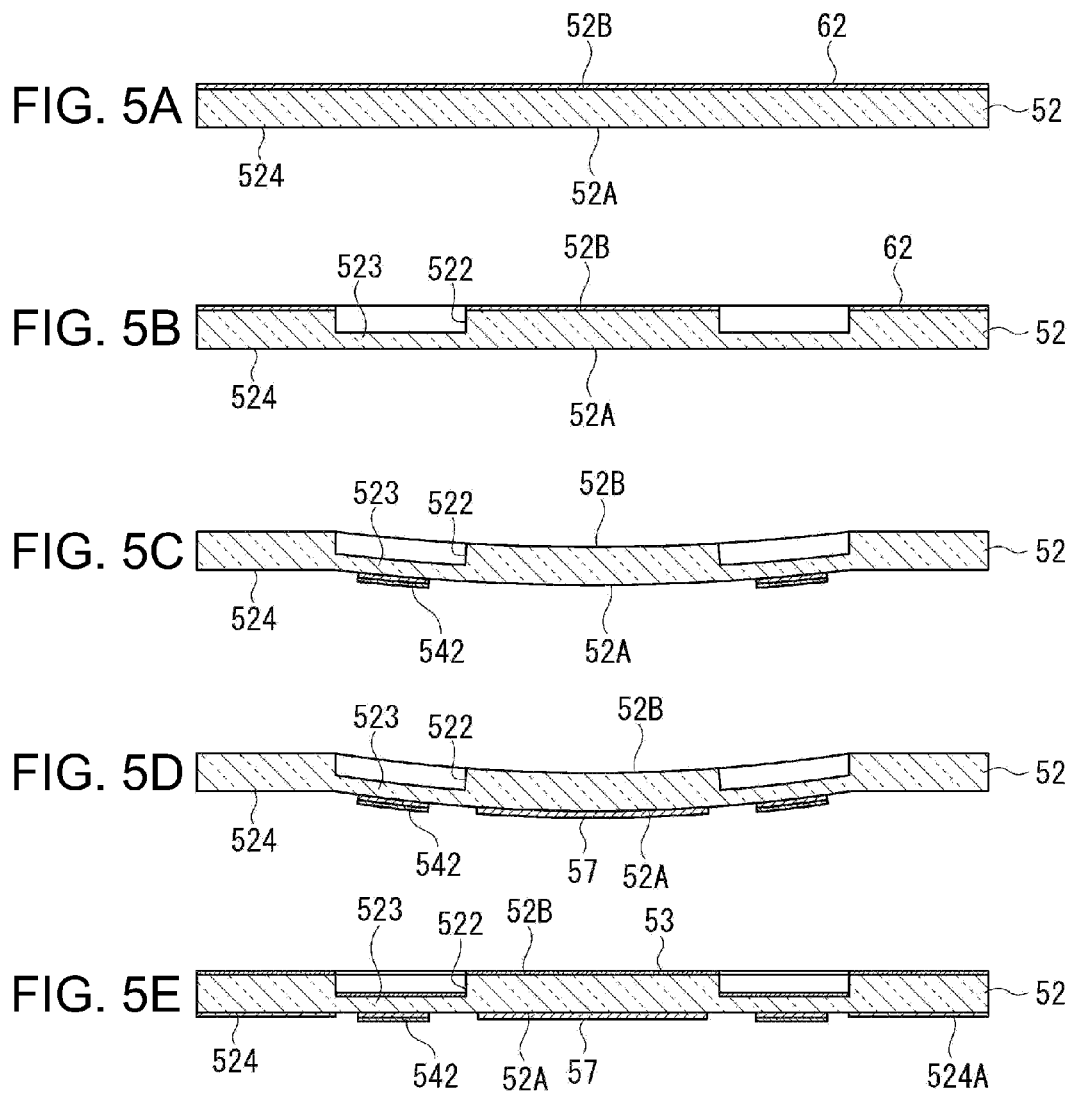
FIGS. 5A to 5E are diagrams illustrating a procedure of manufacturing a second substrate of the etalon according to the first embodiment.

A resist 62 is formed on the second surface 52B of the second substrate 52 under the set sputtering conditions by the use of a sputtering method as shown in FIG. 5A. A pattern for forming the connection holding portion 523 is formed in the resist 62 and the resist 62 is etched to correspond to the pattern. By wet-etching the quartz glass substrate, the connection holding portion 523 with a thickness of 50 μm and the movable portion 522 are simultaneously formed as shown in FIG. 5B.

Then, an ITO film and a two-layered Au/Cr film including an Au layer and a Cr layer are formed on the surface of the second substrate 52 facing the first substrate 51 by the use of a sputtering method. The ITO film is first formed by forming an ITO layer with a predetermined thickness $T_{21}$ and the Au/Cr film is then formed with a predetermined thickness $T_{22}$ by the use of a sputtering method.

A resist having a desired electrode pattern is formed on the Au/Cr film and the Au/Cr film and the ITO film are etched by the use of a photolithographic method. Thereafter, by removing the resist remaining on the surface of the second substrate 52 facing the first substrate 51, the second electrode 542 with a predetermined thickness $T_2$ is formed as shown in FIG. 5C.

Here, when the second electrode 542 is formed on the second substrate 52, the film formation is performed so that the internal stress acting on the second electrode 542 is the compressive stress. Accordingly, as shown in FIG. 5C, the second substrate 52 warps convexly toward the first substrate 51.

On the first surface 52A on which the second electrode 542 is formed, a resist (lift-off resist) is formed in the region other than the region in which the movable mirror 57 with an area determined in advance by simulation should be formed. A thin film of $TiO_2$ and $SiO_2$ with a predetermined thickness $T_1$ is formed under the set sputtering conditions by the use of a sputtering method.

By removing the resist, the movable mirror 57 having a circular shape with a diameter of about 3 mm and a predetermined thickness $T_1$ is formed on the first surface 52A on which the second electrode 542 is formed, as shown in FIG. 5D.

Here, when the movable mirror 57 is formed on the second substrate 52, the film formation is performed so that the internal stress acting on the movable mirror 57 is the compressive stress. Accordingly, as shown in FIG. 5D, the second substrate 52 warps more convexly toward the first substrate 51.

A resist having a pattern in which only a region for forming the second bonding film 524A is exposed is formed on the first surface 52A and a plasma polymerized film with a thickness of 30 nm is formed of polyorganosiloxane by the use of a plasma CVD method. Then, by removing the resist, the second bonding film 524A is formed on the bonding face 524 as shown in FIG. 5E.

A silicon dioxide ($SiO_2$) film with a predetermined thickness $T_4$ is formed on the entire second surface 52B of the second substrate 52 to form the warp preventing film 53. Accordingly, the warp preventing film 53 is formed so as to have the same bending moment $M_4$ as the bending moment $M_3$ applied to the second substrate 52 by the second electrode 542 and the movable mirror 57. As a result, the bending moment $M_3$ acting on the second substrate 52 due to the internal stresses of the second electrode 542 and the movable mirror 57 and the bending moment $M_4$ acting on the second substrate 52 due to the internal stress of the warp preventing film 53 are balanced with each other, whereby the warp of the second substrate 52 is corrected as shown in FIG. 5E.

In this way, the second substrate 52 including the warp preventing film 53 and having the warp corrected is formed.

5-3. Bonding Step

The substrates 51 and 52 formed in the first substrate forming step and the second substrate forming step are bonded to each other. Specifically, an $O_2$ plasma process or a UV process is performed to give activation energy to the plasma polymerized film constituting the first bonding film 513A and the second bonding film 524A formed on the substrates 51 and 52. The $O_2$ plasma process is performed for 30 seconds under the conditions of an $O_2$ flow rate of 30 cc/min, a pressure of 27 Pa, and RF power of 200 W. The UV process is performed for 3 minutes using an excimer UV (with a wavelength of 172 nm) as a UV light source. By giving the activation energy to the plasma polymerized film, aligning the two substrates 51 and 52, and superimposing the first bonding film 513A and the second bonding film 524A with a weight applied thereto, the substrates 51 and 52 are bonded to each other. Accordingly, the etalon 5 is manufactured.

6. Operational Advantages of First Embodiment

The etalon 5 according to the first embodiment of the invention achieves the following advantages.

(1) The warp preventing film 53 is formed on the entire surface of the second substrate 52 opposite to the surface facing the first substrate 51 and the compressive stress acts in the in-plane direction of the warp preventing film 53 at the time of forming the film. Accordingly, the second substrate 52 warps convexly toward the side opposite to the first substrate 51 due to the compressive stress acting in the in-plane direction of the warp preventing film 53, thereby reducing the convex warp of the second substrate 52 toward the first substrate 51. As a result, it is possible to set the gap G between the fixed mirror 56 and the movable mirror 57 in the initial state with high precision and to keep the fixed mirror 56 and the movable mirror 57 parallel to each other with high precision, thereby improving the resolution.

(2) The bending moment $M_3$ acting on the second substrate 52 at the time of forming the second electrode 542 and the movable mirror 57 on the second substrate 52 is set to be equal to the bending moment $M_4$ acting on the second substrate 52 at the time of forming the warp preventing film 53 on the second substrate 52 (see Expression (5)). Both bending moments $M_3$ and $M_4$ are balanced to cancel the bending moment $M_3$ acting on the second substrate 52 at the time of forming the second electrode 542 and the movable mirror 57 on the second substrate 52 with the bending moment $M_4$ acting on the second substrate 52 at the time of forming the warp preventing film 53 on the second substrate 52, thereby satisfactorily preventing the warp in the initial state. As a result, it is possible to set the gap G with higher precision.

(3) Since the warp preventing film 53 is formed on the entire surface of the second substrate 52 opposite to the first substrate 51, it is possible to make a pattern forming step of forming the warp preventing film 53 on the second substrate 52 unnecessary in the manufacturing process, thereby simplifying the manufacturing process.

(4) Since the warp preventing film 53 is formed of the quartz glass material ($SiO_2$) which is a material having the same optical characteristics as the second substrate 52, it is possible to prevent light incident on the second substrate 52 from being reflected by the bonding face between the warp preventing film 53 and the second substrate 52. Accordingly, it is possible to transmit only light of a specific wavelength out of the incident light.

Second Embodiment

A second embodiment of the invention will be described below.

An etalon according to this embodiment has the same configuration as the above-mentioned etalon 5. The second electrode 542 of the etalon 5 is a stacked body of the ITO layer and the metal stacked body of Au/Cr or the like. On the contrary, this embodiment is different from the first embodiment, in that the second electrode of the etalon according to this embodiment has a single-layered structure of only the ITO layer and an insulating film is stacked on the second electrode.

In the following description, the same elements as the first embodiment are referenced by the same reference numerals and signs and description thereof is not repeated.

Figure 6:
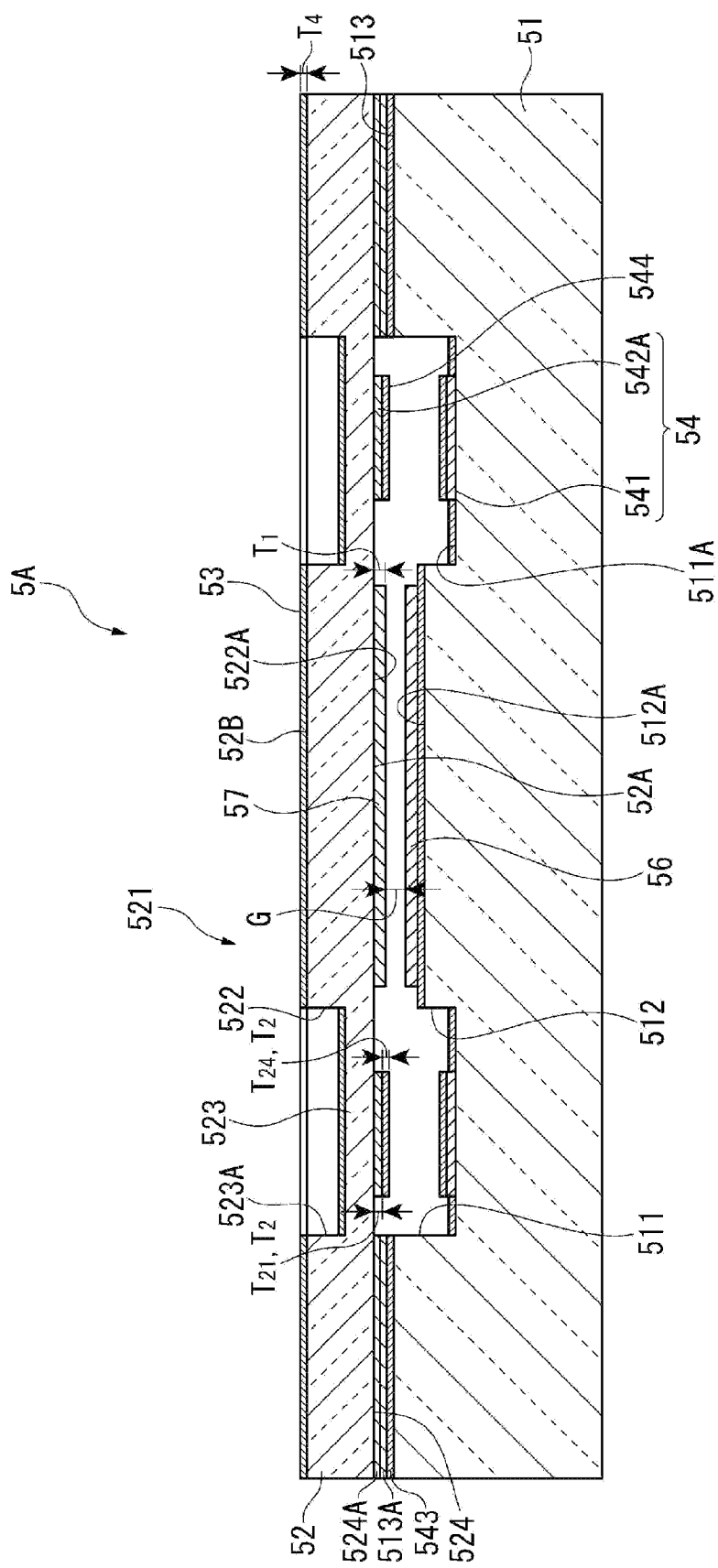
FIG. 6 is a sectional view schematically illustrating the configuration of an etalon according to a second embodiment of the invention.

FIG. 6 is a sectional view schematically illustrating the etalon 5A according to this embodiment.

As shown in FIG. 6, the etalon 5A according to this embodiment has the same configuration as the above-mentioned etalon 5, except that a second electrode 542A and an insulating film 544 formed of $SiO_2$ so as to cover the second electrode 542A are formed on the surface of the second substrate 52 facing the first substrate 51. Here, the stacked film described in the above-described aspects includes the second electrode 542A and the insulating film 544.

In this embodiment, similarly to the first embodiment, the sum of the products of the internal stresses of the layers of the second electrode 542A and the insulating film 544, the thicknesses of the films, and the areas in the plan view serves as the bending moment acting on the second substrate 52. Here, when the bending moment applied to the second substrate 52 by the second electrode 542A and the insulating film 544 is $M_5$, the internal stress of the stacked film is $\sigma_5$, the thickness of the stacked film is $T_5$, the area of the stacked film in the plan view is $S_2$, the internal stress of the insulating film 544 is $\sigma_{24}$, and the thickness of the insulating film 544 is $T_{24}$, Expression (6) is established.

$$M_5 \propto \sigma_5 \times T_5 \times S_2 = (\sigma_{21} \times T_{21} \times S_2) + (\sigma_{24} \times T_{24} \times S_2) \qquad (6)$$

The bending moment $M_5$ calculated by Expression (6) serves as a force of the second electrode 542A and the insulating film 544 which causes the second substrate 52 to warp. The sum of the bending moment $M_5$ and the bending moment $M_1$, which is calculated by Expression (1), applied to the second substrate 52 by the movable mirror 57 is set to be equal to the bending moment $M_4$ (Expression (7): $M_5+M_1=M_4$), which is calculated by Expression (4), applied to the second substrate 52 by the warp preventing film 53.

In the second embodiment, the direction of the total internal stress of the stacked film is preferably parallel to the direction of the internal stress of the movable mirror 57 or the warp preventing film 53. Accordingly, for example, when the internal stresses of the stacked film, the movable mirror 57, and the warp preventing film 53 are the compressive stress, one of the second electrode 542 and the insulating film 544 may be a film having the tensile stress and the internal stress $\sigma_5$ of the stacked film is preferably the compressive stress.

The etalon 5A according to the second embodiment achieves the following advantages in addition to the advantages of the first embodiment.

In this embodiment, since the insulating film 544 is stacked on the second electrode 542A in addition to the insulating film 543 stacked on the first electrode 541, it is possible to satisfactorily prevent the leakage of current between the first electrode 541 and the second electrode 542A due to discharge or the like, thereby causing the first electrode 541 and the second electrode 542A to keep desired charges corresponding to the set voltage. Accordingly, it is possible to control the gap between the fixed mirror 56 and the movable mirror 57 with high precision and thus to extract light of a desired wavelength by the use of the etalon 5 with high precision.

Unlike the first embodiment, the second electrode 542A has a single-layered structure and the insulating film 543 is formed on the second electrode 542A. In this case, the bending moment $M_5$ can be calculated by Expression (6). The thicknesses $T_{21}$ and $T_{24}$ of the second electrode 542A and the insulating film 543 can be properly set to satisfy Expression (7). Accordingly, even when the second electrode has a configuration different from that of the second electrode 542 in the first embodiment, the same advantages as the first embodiment can be achieved, thereby improving the general usability in configuration.

Third Embodiment

A third embodiment of the invention will be described below.

An etalon according to this embodiment has a configuration similar to the above-mentioned etalon 5. The warp preventing film 53 of the etalon 5 is formed on the entire second surface 52B of the second substrate 52. On the contrary, a warp preventing film 53A as the first warp preventing film of the etalon according to this embodiment is formed at only the region (the top surface of the movable portion 522) covering the movable mirror 57 in the etalon plan view on the second surface 52B of the second substrate 52.

In the following description, the same elements as the first embodiment are referenced by the same reference numerals and signs and description thereof is not repeated.

Figure 7:
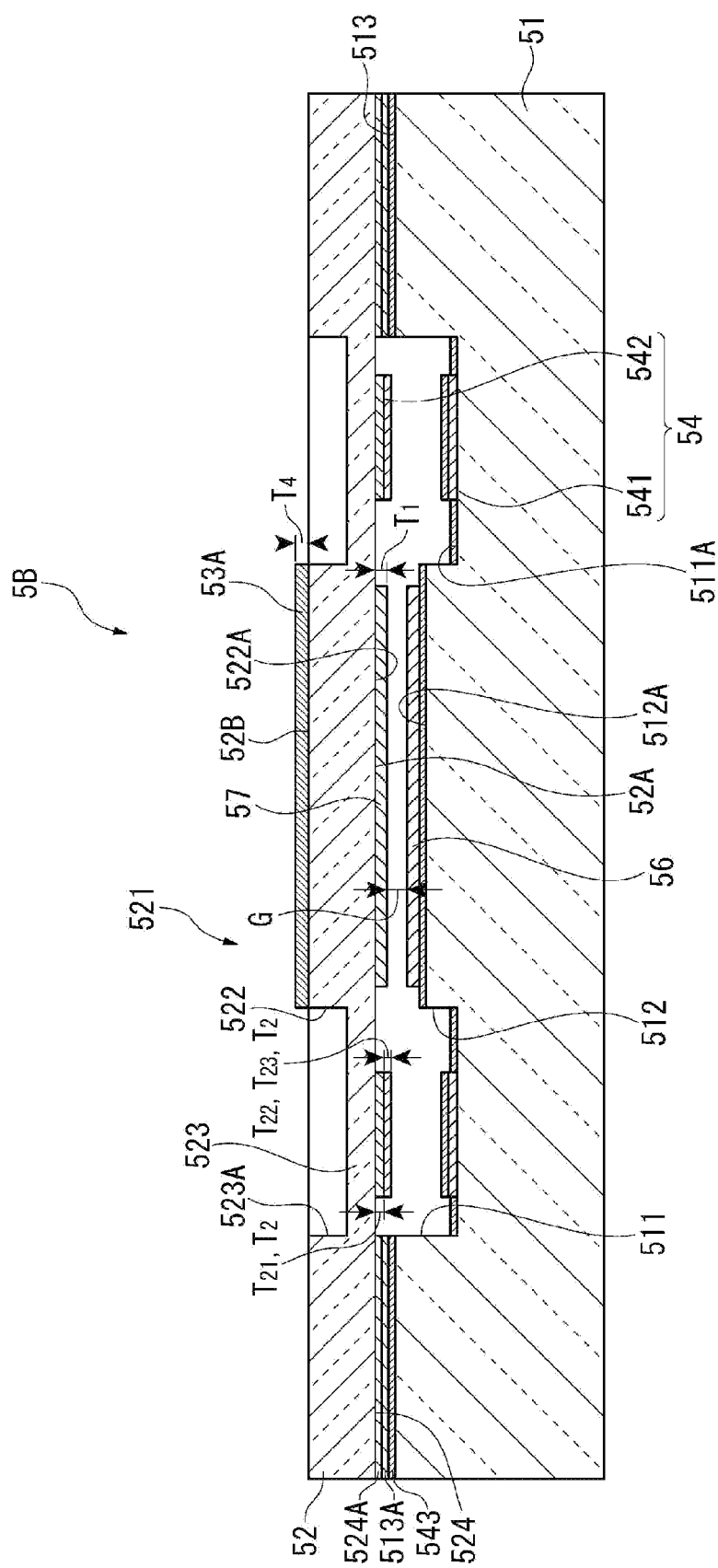
FIG. 7 is a sectional view schematically illustrating the configuration of an etalon according to a third embodiment of the invention.

FIG. 7 is a sectional view schematically illustrating the configuration of the etalon 5B according to this embodiment.

The etalon 5B according to this embodiment has the same configuration as the etalon 5, except that the warp preventing film 53A is formed on only the top surface of the movable portion 522 on the second surface 52B of the second substrate 52 as shown in FIG. 7. That is, the warp preventing film 53A in this embodiment is formed in only the region covering the movable mirror 57 in the etalon plan view.

In this embodiment, the warp caused in the second substrate 52 due to the internal stresses of the second electrode 542 and the movable mirror 57 is corrected using only the warp preventing film 53A formed on the top surface of the movable portion 522. Here, the thickness $T_4$ of the warp preventing film 53A is set on the basis of Expression (4), and the bending moment $M_4$ acting on the second substrate 52 due to the internal stress of the warp preventing film 53A is equal in magnitude to and is opposite in direction to the bending moment $M_3$ acting on the second substrate 52 due to the internal stresses of the second electrode 542 and the movable mirror 57. Accordingly, the bending moments acting on the second substrate 52 are cancelled by each other, thereby preventing the warp of the substrate.

Figure 8A:
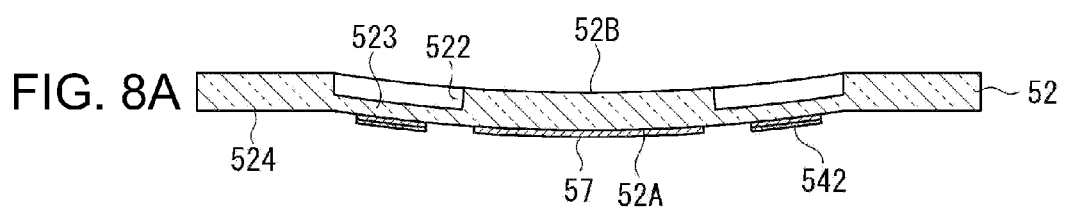
FIGS. 8A and 8B are diagrams illustrating a procedure of manufacturing a second substrate of the etalon according to the third embodiment.
Figure 8B:
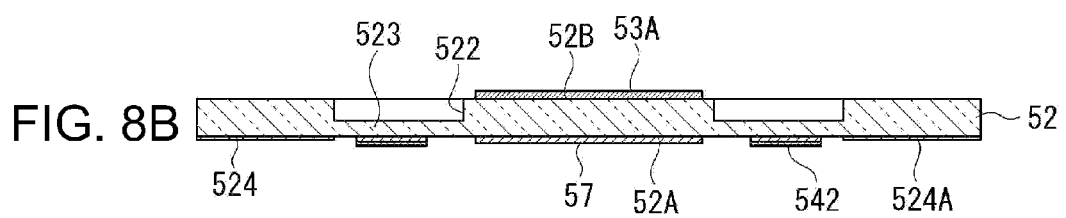

FIGS. 8A and 8B are diagrams illustrating the process of manufacturing the second substrate 52 in this embodiment. In the process of manufacturing the second substrate 52 in this embodiment, the steps in the first embodiment shown in FIGS. 5A to 5C are performed in the same way and thus are not shown in FIGS. 8A and 8B and are not described.

As shown in FIG. 8A, the second electrode 542 and the movable mirror 57 are formed on the first surface 52A of the second substrate 52. At this time, since the second electrode 542 and the movable mirror 57 are formed on the second substrate 52 so as to apply the compressive stress in the in-plane direction thereof, similarly to the first embodiment, the second substrate 52 warps convexly toward the first substrate 51.

Similarly to the first embodiment, the second bonding film 524A is formed on the bonding face 524, as shown in FIG. 8B.

A resist having a pattern (lift-off pattern) in which only the region for forming the warp preventing film 53A is exposed is formed on the second surface 52B of the second substrate 52 under the above-mentioned sputtering conditions, and a silicon dioxide (SiO$_2$) film with a thickness T$_4$ previously determined by simulation is formed thereon. The warp preventing film 53A is formed on the second substrate 52 so that the direction of the internal stress (the compressive stress) acting on the warp preventing film 53A is parallel to the direction of the internal stress (the compressive stress) acting on the second electrode 542 and the movable mirror 57.

By removing the resist, the warp preventing film 53A is formed as shown in FIG. 8B.

In this way, the second substrate 52 including the warp preventing film 53A and having the warp corrected is formed.

The etalon 5B according to the third embodiment achieves the following advantages in addition to the advantages (1), (2), and (4) in the first embodiment.

In this embodiment, since the warp preventing film 53A is formed on only the movable portion 522, the bending moment M$_4$ acting on the movable portion 522 cancels the bending moment M$_3$ applied to the second substrate 52 by the second electrode 542 and the movable mirror 57, thereby keeping the fixed mirror 56 and the movable mirror 57 parallel to each other with high precision.

Since the warp preventing film 53A is formed on only the movable portion 522, the diaphragm as the connection holding portion 523 surrounding the movable portion 522 can easily warp, thereby easily controlling the driving of the diaphragm at the time of applying the driving voltage across the first electrode 541 and the second electrode 542.

Since the thickness of the movable portion 522 increases, the rigidity of the movable portion 522 increases and the movable portion becomes harder to warp. Accordingly, it is possible to more satisfactorily prevent the warp of the movable mirror 57.

Modification of Embodiments

The invention is not limited to the above-mentioned embodiments but includes modifications, improvements, and the like allowing the achievement of the advantages of the invention.

In the above-mentioned embodiments, the second electrodes 542 and 542A, the insulating film 544, the movable mirror 57, and the warp preventing films 53 and 53A are formed on the second substrate 52 so that the internal stresses acting thereon are the compressive stress, but they may be formed so that the internal stress is the tensile stress. In this case, the second electrodes 542 and 542A, the insulating film 544, the movable mirror 57, and the warp preventing films 53 and 53A can be preferably formed so that the directions of the internal stresses acting thereon are parallel to each other.

In the above-mentioned embodiments, the warp preventing films 53 and 53A are formed on the entire second surface 52B of the second substrate 52 and in the region (the top surface of the movable portion 522) covering the movable mirror 57, respectively, but the warp preventing film may be formed on a part of the connection holding portion 523 which is the diaphragm in addition to the top surface of the movable portion 522.

Figure 9:
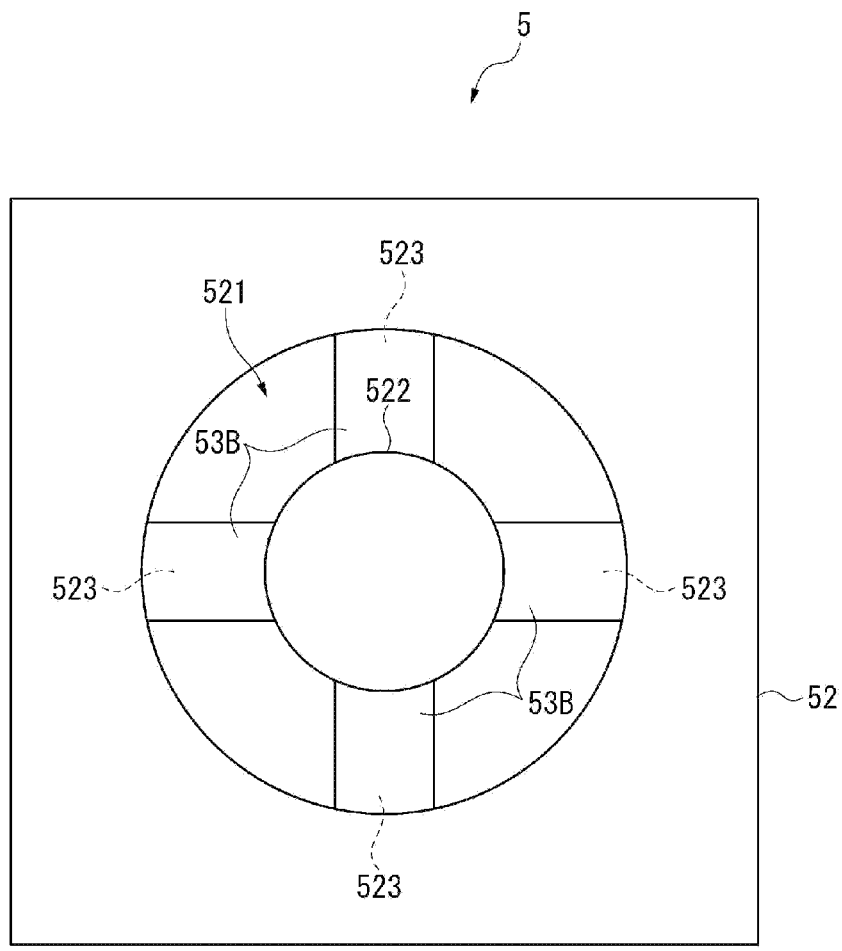
FIG. 9 is a diagram illustrating a modified example of the invention.

As shown in FIG. 9, a warp preventing film 53B as the second warp preventing film may not be formed to be continuous from the connection holding portion 523 or may be intermittently formed to be symmetric with respect to the connection holding portion 523 about the center point in the etalon plan view of the movable face 522A on which the first warp preventing film is formed. According to this configuration, compared with the case where the warp preventing film is not formed to be symmetric about the point, it is possible to balance the warps at the time of applying a voltage across the electrodes to warp the substrate and thus to keep the mirrors parallel to each other, thereby maintaining high gap precision.

In the second embodiment, the insulating film 544 is formed with the same area as the second electrode 542A in the etalon plan view and is stacked on the second electrode 542A, but the insulating film 544 may be formed with an area greater than the area of the second electrode 542A in the etalon plan view so as to cover the second electrode 542A. ITO is used as the material of the second electrode 542A, an Au/Cr metal stacked body may be used instead of the ITO. The insulating film 544 may be stacked on the two-layered second electrode 542 in the first embodiment. In this case, the bending moment M acting on the second substrate 52 can be calculated by combining Expressions (2) and (6).

The warp preventing film 53A according to the third embodiment may be added to the configuration of the etalon 5A according to the second embodiment.

In the step of manufacturing the second substrate 52 in the above-mentioned embodiments, the second electrodes 542 and 542A are formed earlier than the movable mirror 57, but the movable mirror 57 may be formed earlier. The warp preventing films 53 and 53A are formed in the final step, but may be earlier formed than the second electrodes 542 and 542A and the movable mirror 57.

In the above-mentioned embodiments, the bonding faces 513 and 524 are bonded by the use of the first bonding film 513A and the second bonding film 524A, but the invention is not limited to this configuration. For example, a so-called normal-temperature activated bonding method of activating the bonding faces 513 and 524 and superimposing and pressing the activated bonding faces 513 and 524 to each other may be used instead of forming the first bonding film 513A and the second bonding film 524A, or any other bonding method may be used.

The entire disclosure of Japanese Patent Application No. 2010-187953, filed Aug. 25, 2010 is expressly incorporated by reference herein.

What is claimed is:

1. A wavelength-variable interference filter comprising:
a movable substrate that includes a movable portion and a connection portion surrounding the movable portion, the movable substrate having first and second surfaces opposite to each other;
a reflector that is disposed on the first surface of the movable substrate;
an electrode that is disposed on the first surface of the movable substrate; and
a warp preventing member that is disposed on the second surface of the movable substrate,
wherein a perimeter of the warp preventing member is inwardly spaced apart from a perimeter of the movable portion in a plan view so that the warp preventing member overlaps with the movable portion in the plan view,
an area of the reflector when viewed in plan is less than an area of the warp preventing member, and
when a bending moment of the reflector acting on the movable substrate is M$_1$, a total internal stress of the reflector is σ$_1$, a total thickness of the reflector is T$_1$, an area of the reflector in the plan view is S$_1$, a bending moment of the electrode acting on the movable substrate is M$_2$, an internal stress of the electrode is σ$_2$, a total thickness of the electrode is T$_2$, an area of the electrode in the plan view is $S_2$, a bending moment of the warp preventing member acting on the movable substrate is $M_3$, an internal stress of the warp preventing member is $\sigma_3$, a thickness of the warp preventing member is $T_3$, and an area of the warp preventing member overlapping with the movable substrate in the plan view is $S_3$, the following expressions are satisfied:

$$M_1 \propto \sigma_1 \times T_1 \times S_1;$$

$$M_2 \propto \sigma_2 \times T_2 \times S_2; \text{ and}$$

$$M_3 \propto \sigma_3 \times T_3 \times S_3 = M_1 + M_2.$$

2. The wavelength-variable interference filter of claim 1, wherein a thickness of the movable portion is larger than a thickness of the connection portion.

3. The wavelength-variable interference filter of claim 2, wherein the reflector is formed on the movable portion.

4. The wavelength-variable interference filter of claim 3, wherein the warp preventing member is formed on the movable portion.

5. The wavelength-variable interference of claim 2, wherein the electrode is formed on the connection portion.

6. The wavelength-variable interference filter of claim 1, wherein
the reflector is configured with a multilayer film of $TiO_2$ and $SiO_2$ layers, and
when an internal stress of the $TiO_2$ layer is $\sigma_{11}$, a thickness of the $TiO_2$ layer is $T_{11}$, the number of layers of the $TiO_2$ layer is $N_{11}$, an internal stress of the $SiO_2$ layer is $\sigma_{12}$, a thickness of the $SiO_2$ layer is $T_{12}$, and the number of layers of the $SiO_2$ layer is $N_{12}$, the following expression is satisfied:

$$M_1 \propto (\sigma_{11} \times T_{11} \times N_{11} \times S_1) + (\sigma_{12} \times T_{12} \times N_{12} \times S_1).$$

7. The wavelength-variable interference filter of claim 1, wherein
the electrode is configured with a multilayer film of ITO, Cr and Au layers, and
when an internal stress of the ITO layer is $\sigma_{21}$, a thickness of the ITO layer is $T_{21}$, an internal stress of the Cr layer is $\sigma_{22}$, a thickness of the Cr layer is $T_{22}$, an internal stress of the Au layer is $\sigma_{23}$, a thickness of the Au layer is $T_{23}$, the following expression is satisfied:

$$M_2 \propto \sigma_2 \times T_2 \times S_2 = (\sigma_{21} \times T_{21} \times S_2) + (\sigma_{22} \times T_{22} \times S_2) + (\sigma_{23} \times T_{23} \times S_2).$$

8. The wavelength-variable interference filter of claim 1, wherein
a first internal stress direction of the warp preventing member, a second internal stress direction of the reflector, and a third internal stress direction of the electrode are parallel to each other.

9. The wavelength-variable interference filter of claim 1, wherein
the warp preventing member is only formed on the movable portion.

10. The wavelength-variable interference filter of claim 1, wherein
the movable substrate further includes a peripheral portion surrounding the connection portion, and
the warp preventing member is formed on the peripheral portion.

11. An optical module comprising the wavelength-variable interference filter of claim 1.

12. An optical analysis device comprising the optical module of claim 11.

13. A wavelength-variable interference filter comprising:
a movable substrate including a movable portion having a first thickness and a connection portion having a second thickness, the second thickness being less than the first thickness;
a reflector that is disposed on a first surface of the movable substrate, and that is disposed only on the movable portion;
an electrode that is disposed on the first surface of the movable substrate, and that is disposed only on the connection portion; and
a warp preventing member that is disposed on a second surface opposite to the first surface of the movable substrate, and that is disposed only on the movable portion,
wherein a perimeter of the warp preventing member is inwardly spaced apart from a perimeter of the movable portion in a plan view so that the warp preventing member overlaps with the movable portion in the plan view,
an area of the reflector when viewed in plan is less than an area of the warp preventing member, and
when a bending moment of the reflector acting on the movable substrate is $M_1$, a total internal stress of the reflector is $\sigma_1$, a total thickness of the reflector is $T_1$, an area of the reflector in the plan view is $S_1$, a bending moment of the electrode acting on the movable substrate is $M_2$, an internal stress of the electrode is $\sigma_2$, a total thickness of the electrode is $T_2$, an area of the electrode in the plan view is $S_2$, a bending moment of the warp preventing member acting on the movable substrate is $M_3$, an internal stress of the warp preventing member is $\sigma_3$, a thickness of the warp preventing member is $T_3$, and an area of the warp preventing member overlapping with the movable substrate in the plan view is $S_3$, the following expressions are satisfied:

$$M_1 \propto \sigma_1 \times T_1 \times S_1;$$

$$M_2 \propto \sigma_2 \times T_2 \times S_2; \text{ and}$$

$$M_3 \propto \sigma_3 \times T_3 \times S_3 = M_1 + M_2.$$

14. The wavelength-variable interference filter of claim 13, wherein
the reflector is configured with a multilayer film of $TiO_2$ and $SiO_2$ layers, and
when an internal stress of the $TiO_2$ layer is $\sigma_{11}$, a thickness of the $TiO_2$ layer is $T_{11}$, the number of layers of the $TiO_2$ layer is $N_{11}$, an internal stress of the $SiO_2$ layer is $\sigma_{12}$, a thickness of the $SiO_2$ layer is $T_{12}$, and the number of layers of the $SiO_2$ layer is $N_{12}$, the following expression is satisfied:

$$M_1 \propto (\sigma_{11} \times T_{11} \times N_{11} \times S_1) + (\sigma_{12} \times T_{12} \times N_{12} \times S_1).$$

15. The wavelength-variable interference filter of claim 13, wherein
the electrode is configured with a multilayer film of ITO, Cr and Au layers, and
when an internal stress of the ITO layer is $\sigma_{21}$, a thickness of the ITO layer is $T_{21}$, an internal stress of the Cr layer is $\sigma_{22}$, a thickness of the Cr layer is $T_{22}$, an internal stress of the Au layer is $\sigma_{23}$, a thickness of the Au layer is $T_{23}$, the following expression is satisfied:

$$M_2 \propto \sigma_2 \times T_2 \times S_2 = (\sigma_{21} \times T_{21} \times S_2) + (\sigma_{22} \times T_{22} \times S_2) + (\sigma_{23} \times T_{23} \times S_2).$$

16. The wavelength-variable interference filter of claim 13, wherein a first internal stress direction of the warp preventing member, a second internal stress direction of the reflector, and a third internal stress direction of the electrode are parallel to each other.

17. An optical module comprising the wavelength-variable interference filter of claim 13.

18. An optical analysis device comprising the optical module of claim 17.

19. A wavelength-variable interference filter comprising:
a movable substrate including a movable portion having a first thickness and a connection portion having a second thickness, the second thickness being less than the first thickness;
a first reflector that is disposed on a first surface of the movable portion;
an electrode that is disposed on the connection portion; and
a warp preventing member that is disposed on a second surface of the movable portion, the second surface opposing to the first surface,
wherein an area of the first reflector is included in an area of the warp preventing member in a plan view such that an area of the first reflector in the plan view is less than an area of the warp preventing member, and a perimeter of the movable portion is spaced apart from a perimeter of the warp preventing member in the plan view.

20. The wavelength-variable interference filter of claim 19, further comprising:
a second reflector that is disposed so as to oppose to the first reflector.

21. The wavelength-variable interference filter of claim 19, wherein the perimeter of the warp preventing film is disposed inside of the perimeter of the movable portion in the plan view.

22. An optical module comprising the wavelength-variable interference filter of claim 19.

23. An optical analysis device comprising the optical module of claim 22.

24. A wavelength-variable interference filter, comprising:
a movable substrate including a movable portion having a first thickness and a connection portion having a second thickness, the second thickness being less than the first thickness;
a reflector that is disposed on a first surface of the movable portion;
an electrode that is disposed on the movable substrate; and
a warp preventing member that is disposed on a second surface of the movable portion, the second surface being opposed to the first surface,
wherein a first area of the reflector is included in a second area of the warp preventing member in a plan view such that the first area is less than the second area, and a perimeter of the movable portion is spaced apart from a perimeter of the war preventing member in the plan view.

25. The wavelength-variable interference filter according to claim 24, wherein the warp preventing member is formed of silicon dioxide.

* * * * *